(12) United States Patent
Unni et al.

(10) Patent No.: US 10,095,247 B2
(45) Date of Patent: Oct. 9, 2018

(54) SYSTEM AND METHOD FOR CONTROLLING OSCILLATORY INSTABILITIES IN A DEVICE

(71) Applicant: Indian Institute of Technology Madras, Chennai (IN)

(72) Inventors: Vishnu Rajasekharan Unni, Chennai (IN); Vineeth Nair Vinod, Chennai (IN); Sujith Raman Pillai Indusekharan Nair, Chennai (IN); Achintya Mukhopadhyay, Chennai (IN)

(73) Assignee: INDIAN INSTITUTE OF TECHNOLOGY MADRAS, Chennai, TN (IN)

( * ) Notice: Subject to any disclaimer, the term of this patent is extended or adjusted under 35 U.S.C. 154(b) by 221 days.

(21) Appl. No.: 15/033,897

(22) PCT Filed: Dec. 3, 2014

(86) PCT No.: PCT/IN2014/000750
§ 371 (c)(1),
(2) Date: May 2, 2016

(87) PCT Pub. No.: WO2015/083186
PCT Pub. Date: Jun. 11, 2015

(65) Prior Publication Data
US 2016/0282885 A1 Sep. 29, 2016

(30) Foreign Application Priority Data
Dec. 4, 2013 (IN) .......................... 5590/CHE/2013

(51) Int. Cl.
| | | |
|---|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |

(Continued)

(52) U.S. Cl.
CPC .......... G05D 19/02 (2013.01); F02D 41/1498 (2013.01); G05B 23/0227 (2013.01); G05B 23/0289 (2013.01); G06N 7/005 (2013.01); F02D 35/02 (2013.01); F02D 41/1401 (2013.01); F23R 2900/00013 (2013.01)

(58) Field of Classification Search
CPC ........ F02C 9/00; F02D 35/02; F02D 41/1401; F02D 41/1498; F23R 2900/00013; G05B 23/0227; G05B 23/0289; G05D 19/02; G06N 7/005; G06F 11/30
See application file for complete search history.

(56) References Cited

U.S. PATENT DOCUMENTS 5,719,791 A * 2/1998 Neumeier ................. F23N 5/16
310/51
2005/0247064 A1* 11/2005 Lieuwen ................... F23N 5/00
60/773

(Continued)

*Primary Examiner* — Thomas C Lee
*Assistant Examiner* — Zhipeng Wang

(57) ABSTRACT

A method for detecting onset of oscillatory instability in a device is described. The method includes obtaining a symbolic time series of a time series signal corresponding to a dynamic state variable of the device. The method further includes detecting the onset of oscillatory instability in the device based on the symbolic time series.

13 Claims, 4 Drawing Sheets

(51) Int. Cl.
*G05D 19/02* (2006.01)
*G05B 23/02* (2006.01)
*F02D 41/14* (2006.01)
*G06N 7/00* (2006.01)
*F02D 35/02* (2006.01)

(56) References Cited

U.S. PATENT DOCUMENTS

| | | | |
|---|---|---|---|
| 2010/0076698 A1* | 3/2010 | He | F23N 5/242 |
| | | | 702/35 |
| 2010/0199680 A1* | 8/2010 | Nomura | F02C 9/28 |
| | | | 60/773 |
| 2015/0051847 A1* | 2/2015 | Angello | F01D 21/003 |
| | | | 702/35 |

* cited by examiner

FIG. 3a
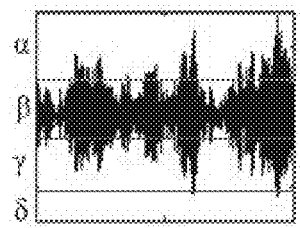
FIG. 3b
...β γ δ α β β γ...
FIG. 3c
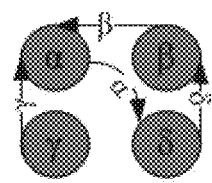
FIG. 3d

SYSTEM AND METHOD FOR CONTROLLING OSCILLATORY INSTABILITIES IN A DEVICE

TECHNICAL FIELD

The embodiments herein generally relate to oscillatory instabilities and more particularly relate to predetermining onset of oscillatory instabilities. The present application is based on, and claims priority from Indian Application Number 5590/CHE/2013 filed on 4 Dec. 2013, and PCT/IN2014/000750 filed on 3 Dec. 2014 the disclosure of which is hereby incorporated by reference.

BACKGROUND

Controlling oscillatory instabilities is an important aspect of a system when a device experiences the oscillatory instabilities. An oscillatory instability degrades device performance, effectively reducing lifetime of the device. Such instabilities are seen in turbulent systems such as but not limited to aero-elastic systems, hydrodynamic systems, magneto-hydrodynamic systems, aero-acoustic systems and thermoacoustic systems. As an example, in devices such as combustors that are used in gas turbines, jet engines, and industrial processing devices such as furnaces and burners, controlling and avoiding the oscillatory instability remains a challenging task as these instabilities are driven by a variety of flow and combustion processes. Further, in these devices, oscillatory instabilities may arise easily as only a small fraction of the energy available to the system is sufficient to drive such instabilities and the corresponding attenuation in the device is weak. Hence, large amplitude pressure oscillations are easily established in the devices resulting in performance loss, reduced operational range, and structural degradation due to increased heat transfer. Furthermore, detection of the onset of oscillatory instabilities remains a challenging task in flow induced vibrations due to aero-elastic instabilities and pipe tones arising due to aero acoustic instabilities. In most scenarios, these oscillations can be undesired and can deteriorate the intended functionality of the device or shut down functioning of the device. In such situations, it is required to detect and indicate the onset of oscillatory instability or an impending instability to allow a controller to take corrective measure. Thus, the corrective measure can prevent damages to the device and sustain device performance.

Conventional methods for controlling oscillatory instabilities in devices such as combustion chambers rely on measurement of pressure fluctuation in the combustion chamber to generate a delayed signal (control signal) based on the pressure fluctuation, which in turn, is used to modulate the fuel pressure inside the fuel line to actively control the instability. However, these techniques require external actuators and consume high amounts of energy for the active control. Further, the control is initiated when the instability is detected; however, occurrence of instability might have done the damage to the device.

Many existing methods provide detecting onset of the oscillatory instability, thus enabling corrective measures to prevent any oscillatory instabilities in the device. However, many of the existing methods follow a frequency domain approach, but presence of noise in the device can make it difficult to use it for practical applications as reliability of detection of the onset of oscillatory instability may be low.

Another existing method utilizes autocorrelation of the pressure signals from the combustor to characterize the damping of the system and thereby predict the stability margin. The existing method allows changes in the stability margin of each of the combustor's stable modes due to tuning, aging, or environmental changes could be monitored through an online analysis of the pressure signal. However since autocorrelation is a linear measure, there is the danger of overlooking various nonlinear dynamic characteristics prior to the instability. Further, the presence of multiple frequencies at the onset of combustion instability makes the quantification of damping unclear.

Thus, the conventional techniques for controlling the oscillatory instabilities require either incorporation of certain design features in the device or the incorporation of sensors or similar detectors that could detect the instability and further control the instability. Further, most of the processes are directed towards identifying the instability after the onset of instability.

Yet another existing method is based on anomaly detection in thermal pulse combustors using symbolic time series analysis. The existing method describes detecting thermoacoustic instability leading to blowout in pulse combustors as frictional coefficient of the tailpipe is changed. Thus, the existing method typically uses anomaly detection technique for pulse combustors.

Hence, there exists a need for a system and a method that could predetermine the onset of oscillatory instability in any turbulent system to control various parameters of the device accordingly and prevent the system from entering an operational regime where it becomes unstable, thus improving the stability margins.

SUMMARY

The principal object of the embodiments herein is to provide a method and system for controlling oscillatory instability in a device by determining the onset of the oscillatory instability.

Another object of the embodiments herein is to provide a method for determining the onset of the oscillatory instability based on an anomaly measure computed using probabilistic Finite State Automata (PFSA) associated with a current state of a dynamic state variable of the device.

Accordingly, the invention provides a method for detecting oscillatory instability in a device. The method includes obtaining a symbolic time series of a time series signal corresponding to a dynamic state variable of the device. The method further includes detecting the onset of oscillatory instability in the device based on the symbolic time series.

Accordingly the invention provides a system for detecting oscillatory instability in a device. The system includes an instability detection unit configured to obtain a symbolic time series of a time series signal corresponding to a dynamic state variable of the device. Further the instability detection unit is configured to detect the onset of oscillatory instability in the device based on the symbolic time series.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which:

FIGS. 3a, 3b, 3c, and 3d illustrate generation of PFSA for an example time series signal, according to an embodiment disclosed herein.

DETAILED DESCRIPTION OF INVENTION

Figure 1:
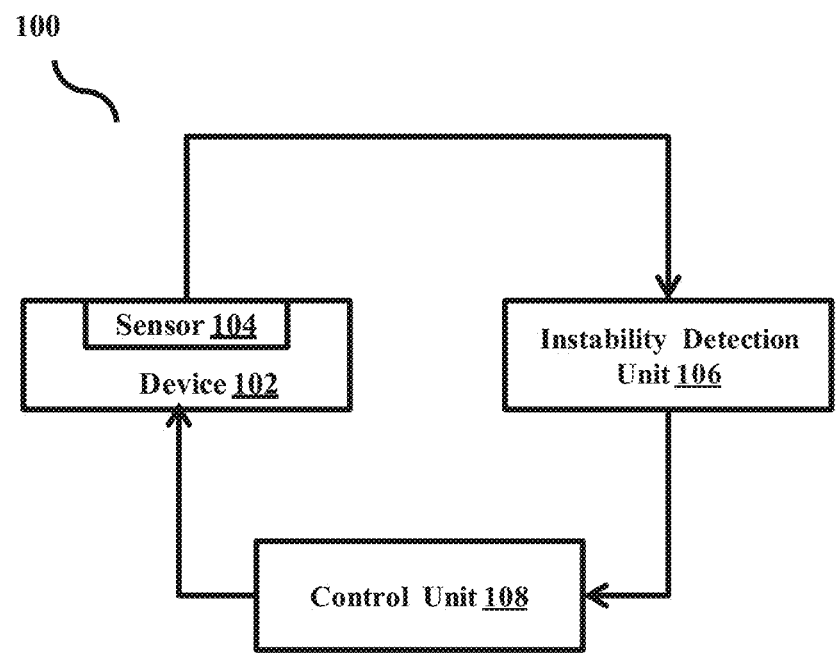
FIG. 1 illustrates various modules of a system for controlling oscillatory instability in a device, according to embodiments as described herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for controlling oscillatory instability in a device. The system is configured to obtain a time series signal corresponding to a dynamic state variable of the device using one or more sensors. The one or more sensors included in the system can be configured to measure any one of the dynamic state variable including, but not limited to, pressure, chemiluminescence intensity, acceleration, and the like. Further, the system is configured to determine the onset of oscillatory instability by analyzing a symbolic time series obtained from the time series signal. Furthermore, the system is configured to vary one or more parameters of the device in accordance to the determined onset of oscillatory instability to prevent occurrence of the oscillatory instability.

The system finds application in all types of turbulent systems. The method and system proposed can detect both instability of any amplitude and also detect instability of a particular amplitude distinctively. Detection of instability of particular amplitude allows the system to provide selective control for the detected instability.

The proposed method and system enables to predetermine the impending oscillatory instability and allows the operator of the system (or a control unit in the system) to take corrective measures. The corrective measures prevent damages to the device and sustain system functioning.

Referring now to the drawings, and more particularly to FIGS. 1 through 4, where similar reference characters denote corresponding features consistently throughout the figures, there are shown preferred embodiments.

FIG. 1 illustrates various modules of a system 100 for controlling oscillatory instability in a device, according to embodiments as described herein. In an embodiment, the system 100 includes a device 102 with a sensor 104, an instability detection unit 106, and a control unit 108.

In an embodiment, the device 102 described herein can be for example, a combustor that is used in gas turbines, jet engines, and industrial processing devices such as furnaces and burners that are subjected to oscillatory instabilities. In an embodiment, the device 102 can be any other device that may experience oscillatory instability.

The system 100 is a feedback control system to detect and control the onset of the oscillatory instability in the device 102. The feedback element of the system 100 can include one or more sensors placed in the device 102 that are configured to measure one or more dynamic state variables of the device 102. The measured dynamic state variable can be monitored by the instability detection unit 106 that is placed in the feedback loop. The instability detection unit 106 can be configured to detect the onset of the oscillatory instability in the device 102 by analyzing the measured dynamic state variables received from one or more sensors. In an embodiment, the dynamic state variables measured can include but are not limited to pressure, velocity, chemiluminescence intensity or any dynamic state variable capable of providing indication for onset of the oscillatory instability. In an embodiment, a combination of one or more dynamic state variables can be used.

In an embodiment, the system 100 includes the sensor 104 (placed in the device 102) configured to sense a dynamic state variable of the device 102. The sensor 104 can be configured to sense variations in the dynamic state variable and produce a time series signal or data corresponding to the sensed variations. For example, the sensor 104 may be configured to conduct optic or acoustic measurement or both based on the dynamic state variables being measured.

The instability detection unit 106 can be configured to analyze the time series signal measured by the sensor 104 and detect onset of oscillatory instability in the device 102. The analysis performed by the instability detection unit 106 is based on the principle that the onset of the oscillatory instability of the device 102 exhibits special patterns in the time series signal captured in the corresponding time window of the time series signal. A symbolic time series analysis is carried out on the time series signal corresponding to the dynamic state variable of the device 102 to identify the presence of instability in the time series signal corresponding to the sensed dynamic state variable by recognizing these patterns. A vector measure is generated using symbolic time series analysis which is utilized to represent the pattern in the time series signal and define an anomaly measure which indicates the evolution of these patterns as the operational conditions differ. The symbolic time series analysis technique used here involves a multi-step process. The first step is generation of the symbolic time series {ST[k]} from the actual time series signal. The second step is constructing a state vector SVp corresponding to the symbolic time series, representing the dynamics of the state that is responsible for the generation of the time series signal {T[k]|k=0 . . . N−1}. And in the third step, an anomaly measure M is defined which serves as an indicator of the proximity of a dynamical state of the device to the stability margin.

Thus, the identification of the occurrence of these changes in the time series signal can enable the detection of the onset of oscillatory instabilities. Further, the system 100 can be configured to provide the detected onset of oscillatory instability to the control unit 108, which can generate appropriate control signals to vary one or more parameters of the device 102 in order to prevent the device from developing oscillatory instabilities by entering a regime where instability occurs.

In an embodiment, the device control requirements may not need the automatic control provided by the control unit. In such cases, the system can only indicate the detected onset of oscillatory instability. Further, an operator of the system 100 may decide on the steps to be taken on the detected instability.

As can be understood by person skilled in the art, the measured time series signal received by the instability detection unit 106 from the sensor 104 can be preprocessed for amplification by a signal conditioner (not shown).

In an embodiment, in case the sensor 104 provides the time series signal in analog domain, an analog to digital converter (not shown) can be used for converting the time series signal from the analog domain to the digital domain before being analyzed by the precursor detection unit 106.

However, certain embodiments may have a different configuration of the components of the system 100 and certain other embodiments may exclude certain components of the system 100. Therefore, such embodiments and any modification by addition or exclusion of certain components of the system 100 and without otherwise deterring the intended function of the system 100 as is apparent from this description and drawings are also within the scope of this invention.

Figure 2:
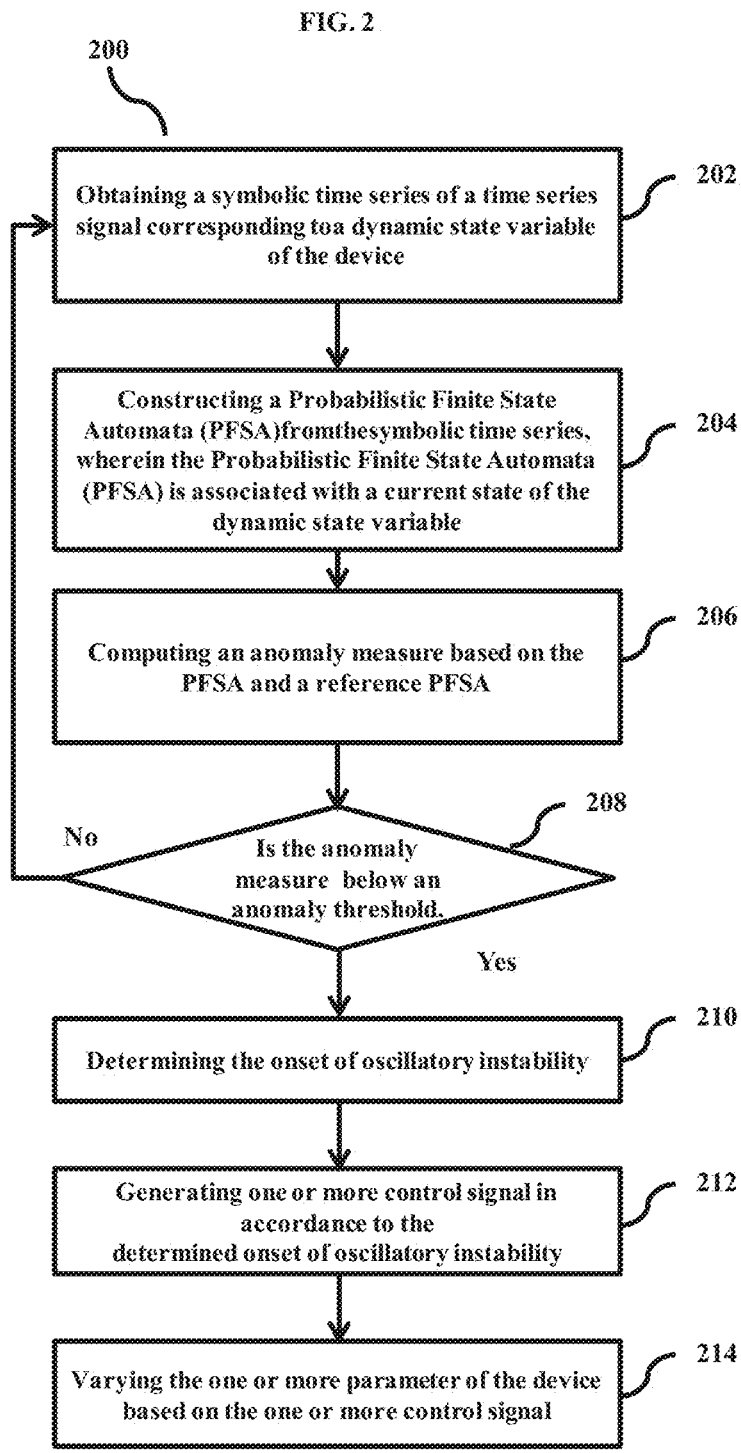
FIG. 2 is a flow diagram illustrating a method for controlling oscillatory instability in a device by determining onset of the oscillatory instability, according to embodiments as described herein.

FIG. 2 is a flow diagram illustrating a method 200 for controlling oscillatory instability in a device by determining the onset of the oscillatory instability, according to embodiments as described herein. At step 202, the method 200 includes obtaining a symbolic time series of a time series signal corresponding to the dynamic state variable of the device 102. In an embodiment, the method 200 allows the instability detection unit 106 to obtain a symbolic time series of a time series signal corresponding to the dynamic state variable of the device 102 from the sensor 104.

The symbolic time series analysis is a technique used in order to encode the complex dynamics of a system (here device 102) embedded in a time series signal $\{T[k]|k=0 \ldots N-1\}$ into a set of finite number of variables.

The construction of the symbolic time series for analysis is given below:

For example, for the time series signal represented by $\{T[k]|k=0 \ldots N-1\}$, a discrete function in time represented by the N data points, N being the length of the time series signal is obtained. The data point at the $k^{th}$ instant is T[k]. Each of the data point has a value T[k] and a particular time stamp 'k' associated with it. In order to construct the symbolic time series from the time series signal $\{T[k]|k=0 \ldots N-1\}$, the N data points constituting the time series signal is partitioned into a mutually exclusive and exhaustive set of finitely many segments (in this particular embodiment, the time series data is directly used for the analysis). However, it is also within the scope of the invention that the data of the time series signal can be first transformed to other representative series such as a normalized series, Hilbert's transform or the like and the further analysis can be done on the representative series. However, when the normalized time series data is used for the analysis and the reference state chosen as a sinusoidal wave with unit amplitude and frequency equal to the frequency of the instability, the proposed method 200 can detect the instability of any amplitude.

In an embodiment, the partitioning is performed by dividing the points into different sets based on the range of the instantaneous value (T[k]) in which they lie. The illustration of partitioning is shown in FIG. 2a. This technique of partitioning is called 'simple partitioning'. Many other forms of partitioning are also possible and are within the scope of this invention. One of the other ways is to reconstruct the phase space and then partition the data points according to the region of phase space it belongs to. The particular partitioning method for an analysis is chosen with the criteria that the chosen type of partition will ensure that the relevant information about the dynamic state is maximum in the symbolic time series. Once the data points are partitioned, each of the partition is represented by a particular symbol as shown in FIG. 3b ($\alpha$, $\beta$, $\gamma$ and $\delta$). For the purpose of illustration, the time series are partitioned into 4 segments. Now, the value of the time series data at each instant k is replaced by the symbol corresponding to the partition to which that particular data point belongs. Thus the symbolic time series is generated as shown in FIG. 3b.

At step 204, the method 200 includes constructing a Probabilistic Finite State Automata (PFSA) from the symbolic time series. The constructed PFSA is associated with a current state of the dynamic state variable for the defined time window. In an embodiment, the method 200 allows the instability detection unit 106 to construct a PFSA from the symbolic time series.

Once the symbolic time series $\{ST[k]\}$ is generated as shown later in FIG. 3b, the PFSA is constructed to represent the dynamic state of the variable that generates the time series $\{T[k]|k=0 \ldots N-1\}$. It can be understood that in construction of PFSA that the symbolic process (represented by the symbolic series) under all conditions can be approximated as a Markov chain of order D (D-Markov machine) representing a quasi-stationary stochastic process. Where, the probability of occurrence of a new symbol depends only on last D symbols, implying that the memory of the system is only extended up to D past observational instances. With this, the states of the D-Markov machine are essentially represented by a word of length D in the symbol string of the symbolic time series as shown later in FIG. 3c. Hence for the symbolic time series represented by P symbols, the number of possible states in a D-Markov machine is $P^D$. With increase in the word size D, the memory embedded in the Markov states of the PFSA increases. Here in the time series analysis the word size D can be restricted to 1. However, it is also within the scope of the invention that any other word length could be used.

At step 206, the method 200 includes computing the anomaly measure based on the PFSA and a reference PFSA. In an embodiment, the method 200 allows the instability detection unit 106 to compute the anomaly measure based on the PFSA and a reference PFSA.

The first step in constructing an anomaly measure is identifying a reference PFSA also referred as a reference state. The anomaly measure here is expected to indicate the proximity of PFSA associated with a current state of the dynamic state variable being measured with the reference state. The PFSA associated with a current state is also referred as current state and is a state for which anomaly measure is being measured; hence the dynamical state corresponding to the onset of instability is selected as the reference state. Once the reference state is identified, then the data points in the time series corresponding to the reference state is partitioned into P mutually exclusive and exhaustive segments in such a way that each of the segment contains approximately equal number of data points. This method of partitioning called an equiprobable partitioning is based on the principle of maximization of information entropy. Other forms of partitioning are also possible and are within the scope of this invention. The partition technique used in this particular embodiment is simple partitioning as seen later in the FIG. 3a. This implies under this partition, when PFSA is constructed, the reference state has a uniform probability for all symbolic states ($P_O$ is the state probability vector for the reference state). Once the partitioning of reference state is performed, the same partition is used in order to construct the symbolic time series corresponding to the other dynamical states. Hence, when PFSA is constructed for a dynamical state other than the reference dynamical state, the probabilities associated with symbolic states have a non-uniform distribution ($P_k$ is the state probability vector for the current state). Thus, an anomaly measure, which is an indicator of proximity of a dynamical state to the reference state, is defined as in equation 1 below:

$$M = \cos^{-1}\left(\frac{\langle P_k P_o \rangle}{\|P_k\|\|P_o\|}\right) \quad (1)$$

Here, $\langle P_k P_O \rangle$ is the inner product of the state probability vectors $P_k$ and $P_O$ and $\|P\|$ denotes the Euclidian norm of the vector P. However, it is also within the scope of invention that several other methods could be used to define the anomaly measure which can compare the PFSA of the current state and the reference state (for e.g., finding the distance between the state vectors, looking at the cross product of the state vector or the like).

In the context of this method 200, the optimal reference state is a state of the dynamical system very near and prior to the onset of instability. In an embodiment, generally the dynamical state corresponding to the oscillatory instability is selected as the reference state. Thus, the reference PFSA is constructed based on the reference state of the dynamic state variable representing the state corresponding to the oscillatory instability in the device.

In an embodiment, the reference state can also be a state prior to the state corresponding to the oscillatory instability.

Thus, the method allows flexibility in selection of the reference state based on the requirement.

Once the reference state is fixed, the anomaly measure can be defined as described above.

At step 208, the method 200 includes determining whether the computed anomaly measure is below an anomaly threshold. In an embodiment the method allows the instability detection unit to determine whether the computed anomaly measure is below an anomaly threshold.

Now, when anomaly measure is monitored against the representative parameter a trend is observed in the anomaly measure. As the stability regime of device 102 approaches the reference state, the anomaly measure starts to reduce. The angle between the PFSA of the reference state and the current state approaches zero as the current state approaches the reference state. This reduction in anomaly measure is defined as the precursor to impending instability. An appropriate threshold can be fixed for the anomaly measure, beyond which control action can be initiated to avoid instability in device 102.

If at step 208, it is determined that the anomaly measure is below the anomaly threshold, then at step 210, the method 200 includes detecting the onset of oscillatory instability and indicating the detected onset of oscillatory instability to the control unit 108. In an embodiment, the method 200 allows the instability detection unit 106 to detect the onset of oscillatory instability on determining that the anomaly measure is below the anomaly threshold.

In an embodiment, if the reference state is selected as unit amplitude sinusoidal wave with a frequency equal to the frequency at which the instability is anticipated, and the time series corresponding to the current state is normalized, instability of any amplitude can be detected. Thus, proposed method includes allowing the instability detection unit to detect both instability of any amplitude and also detect instability of a particular amplitude distinctively based on the particular nature of the reference state and scaling of the time series corresponding to the current state. Detection of instability of particular amplitude allows the system to provide selective control for the detected instability.

At step 212, the method 200 includes generating one or more control signal in accordance to the determined onset of oscillatory instability. In an embodiment, the method 200 allows the control unit 108 to generate one or more control signal in accordance to the determined onset of oscillatory instability received from the instability detection unit. At step 214, the method includes varying one or more parameter of the device 102 based on the one or more control signals. In an embodiment, the method allows the control unit 108 to vary one or more parameter of the device 102 based on the one or more control signals.

In an embodiment the determined oscillatory instability can be indicated to an operator of the system 100. The operator/the controller may decide on the further actions to be taken.

However, if at step 208, the anomaly measure is above the anomaly threshold the method includes performing further monitoring and analyzing the time series signal in the successive time window.

The various actions, acts, blocks, steps, and the like in the method 200 may be performed in the order presented, in a different order or simultaneously. Further, in some embodiments, some actions, acts, blocks, steps, and the like may be omitted, added, modified, skipped, and the like without departing from the scope of the invention.

FIGS. 3a, 3b, 3c and 3d illustrate example generation of PFSA for an example time series signal, according to an embodiment disclosed herein.

FIG. 3a shows example partitioning of the time series signal. The method may utilize plurality of partitioning techniques for portioning the time series signal. In an embodiment, the partitioning can be performed by reconstructing the phase space and then partition the data points according to the region of the phase space it belongs to. The particular partitioning method for an analysis is chosen with the criteria that the chosen type of partition can ensure that the relevant information about the dynamic state variable of the device 102 is maximum in the symbolic time series.

FIG. 3b shows the symbolic time series. Each of the partition shown in the FIG. 3a is represented by a particular symbol as shown in the FIG. 3b ($\alpha$, $\beta$, $\gamma$ and $\delta$). For the purpose of illustration, the time series signal is partitioned into 4 segments. Now, the value of the time series data at each instant k is replaced by the symbol corresponding to the partition to which that particular data point belongs. Thus a symbolic time series is generated as shown in the FIG. 3b.

The FIGS. 3c and 3d show construction of a reference PSFA (reference state) and the PFSA associated with current state of the dynamic state variable. When PFSA is constructed, the reference state has a uniform probability for all symbolic states ($P^o$ is the state probability vector for the reference state). Once the partitioning of reference state is performed, the same partition is used in order to construct the symbolic time series corresponding to the other dynamical states.

Figure 4A:
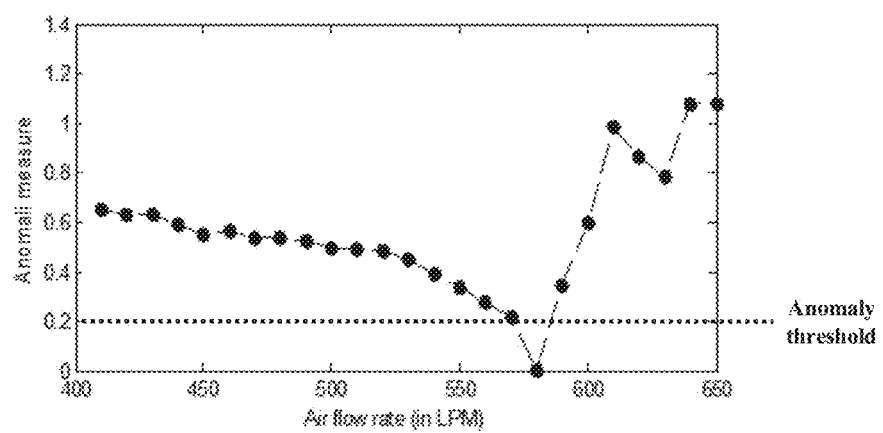
FIGS. 4a and 4b are graphs depicting the variation of anomaly measure as a combustor approaches regimes of instability, according to embodiments as described herein.
Figure 4B:
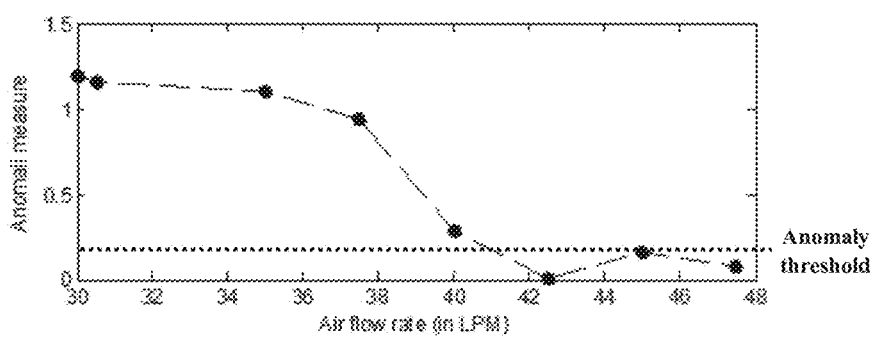

FIGS. 4a and 4b are graphs depicting variation of anomaly measure as a combustor approaches regimes of instability, according to embodiments as described herein. In the FIG. 4a and FIG. 4b the anomaly measure is plotted against the representative parameter such as an air flow rate. The graph of the FIG. 4a enables predicting the impending instability in a combustion system. The graph of the FIG. 4b enables predicting the onset of oscillatory instability in an aeroacoustic system.

As the device 102 approaches the reference state, the anomaly measure starts to reduce. The reduction of anomaly measure to zero indicates that oscillatory instability has occurred in the device 102. However value of anomaly measure close to zero, which can be predefined for the system 100 based on study of the device 102 instability regime, can be identified as anomaly threshold which is precursor to the onset of oscillatory instability. Thus, as shown in the FIGS. 4a and 4b the monitored anomaly measure reducing below the anomaly threshold can be identified as onset of oscillatory instability. Anomaly detection method applied to a combustor is shown in the FIG. 4a. Here the acoustic pressure time series from the combustor acquired using a pressure transducer is used for the analysis. It is seen that the anomaly measure decreases as the reference state is approached (a state near and prior to instability). Further, in an experiment where there is aero-acoustic instability due to the flow of air through an orifice, a similar analysis is performed (pipe tone experiment). The time series corresponding to the acoustic oscillations at the exit of the orifice is measured using a microphone. It is observed that the anomaly detection technique is able to predict the onset of instability in this case also. As shown in the FIG. 4a, the reduction in anomaly measure near to the reference state is the precursor to the impending instability.

The embodiments disclosed herein can be implemented through at least one software program running on at least one hardware device and performing network management functions to control the elements. The elements shown in the FIG. 1 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for detecting an onset of oscillatory instability in a device, the method comprising:
    performing analysis of a time series signal to detect onset of oscillatory instability, wherein said analysis is performed by considering that at said onset of oscillatory instability said time series signal exhibits specific patterns captured in a corresponding time window of said time series signal;
    generating a symbolic time series from said time series signal corresponding to a dynamic state variable of said device;
    identifying presence of oscillatory instability in said time series signal corresponding to said dynamic state variable by recognizing a change in said patterns;
    constructing a Probabilistic Finite State Automata (PFSA) from said symbolic time series, wherein said PFSA is associated with a current state of said dynamic state variable;
    computing an anomaly measure based on said PFSA and a PFSA corresponding to a reference state, wherein said anomaly measure indicates proximity of said PFSA to that of a reference PFSA, wherein said current state corresponds to a state for which said anomaly measure is being measured and a reference state is selected based on a dynamic state corresponding to said onset of oscillatory instability;
    detecting said onset of oscillatory instability in response to determining that said anomaly measure is below an anomaly threshold; and
    varying at least one parameter of said device in accordance to said detected onset of oscillatory instability to control an oscillatory instability.

2. The method of claim 1, wherein detecting said onset of oscillatory instability is based on identifying whether at least one anomaly measure corresponding to the current state crosses said anomaly threshold.

3. The method of claim 1, wherein said reference PFSA is constructed based on said reference state of said dynamic state variable representing one of a state corresponding to said oscillatory instability in said device and a state prior to said state corresponding to said oscillatory instability.

4. The method of claim 1, wherein said anomaly measure is used to vary said at least one parameter.

5. The method of claim 1, wherein obtaining said symbolic time series of said time series signal corresponding to said dynamic state variable of said device comprises:
    obtaining said time series signal of said dynamic state variable, wherein said dynamic state variable is measured by at least one sensor in said device; and
    converting said time series signal to said symbolic time series corresponding to said dynamic state variable.

6. The method of claim 1, wherein varying said at least one parameter of said device in accordance to said detected onset of oscillatory instability to control said oscillatory instability comprises:
    generating at least one control signal in accordance to said detected onset of oscillatory instability; and
    varying said at least one parameter of said device based on said at least one control signal, wherein variation in said at least one parameter is dynamically performed on detecting said onset of oscillatory instability to control said oscillatory instability in said device.

7. A system for detecting onset of oscillatory instability in a device, the system comprising:
    an instability detection unit configured to:
        perform analysis of a time series signal to detect onset of oscillatory instability, wherein said analysis is performed by considering that at said onset of oscillatory instability said time series signal exhibits specific patterns captured in a corresponding time window of said time series signal;

generate a symbolic time series from said time series signal corresponding to a dynamic state variable of said device;

identify presence of oscillatory instability in said time series signal corresponding to said dynamic state variable by recognizing a change in said patterns;

construct a Probabilistic Finite State Automata (PFSA) from said symbolic time series, wherein said PFSA is associated with a current state of said dynamic state variable;

compute an anomaly measure based on said PFSA and a PFSA corresponding to a reference state, wherein said anomaly measure indicates proximity of said PFSA to that of a reference PFSA, wherein said current state corresponds to a state for which said anomaly measure is being measured and a reference state is selected based on a dynamic state corresponding to said onset of oscillatory instability;

detect said onset of oscillatory instability in response to determining that said anomaly measure is below an anomaly threshold; and vary at least one parameter of said device in accordance to said detected onset of oscillatory instability to control an oscillatory instability.

8. The system of claim 7, wherein said instability detection unit is configured to detect said onset of oscillatory instability is based on identifying whether at least one oscillation corresponding to said oscillatory instability crosses said anomaly threshold.

9. The system of claim 7, wherein said instability detection unit is configured to construct said reference PFSA based on said reference state of said dynamic state variable representing one of a state corresponding to said oscillatory instability in said device and a state prior to said state corresponding to said oscillatory instability.

10. The system of claim 7, wherein said anomaly measure is used to vary said at least one parameter.

11. The system of claim 7, wherein said instability detection unit is configured to obtain said symbolic time series of said time series signal corresponding to said dynamic state variable of said device comprises:

obtain said time series signal of said dynamic state variable, wherein said dynamic state variable is measured by said at least one sensor on said device; and convert said time series signal to said symbolic time series corresponding to said dynamic state variable.

12. The system of claim 7, wherein vary said at least one parameter of said device in accordance to said detected onset of oscillatory instability to control said oscillatory instability comprises:

generate at least one control signal in accordance to said determined onset of oscillatory instability; and vary said at least one parameter of said device based on said at least one control signal, wherein variation in said at least one parameter is dynamically performed prior to said detected onset of oscillatory instability to control said oscillatory instability in said device.

13. The system of claim 7, wherein an Analog to Digital Converter (ADC) is configured to convert said time series signal measured by said sensor from an analog domain to digital domain and provide said converted time series signal to said instability detection unit.

* * * * *